United States Patent [19]
Kley

[11] Patent Number: 5,377,552
[45] Date of Patent: Jan. 3, 1995

[54] LINEAR BEARING ASSEMBLY WITH LOAD COMPENSATING BALL BEARING ARRAY

[76] Inventor: Victor B. Kley, 1119 Park Hill Rd., Berkeley, Calif. 94708

[21] Appl. No.: 681,144

[22] Filed: Apr. 5, 1991

[51] Int. Cl.$^6$ .............................................. G01L 5/12
[52] U.S. Cl. ........................... 73/862.49; 73/862.625; 73/862.637
[58] Field of Search ........... 73/862.49, 862.47, 862.48, 73/862.62, 862.64, 862.67, 862.65, 862.63, 774, 862.621, 862.622, 862.623, 862.625, 862.636, 862.637

[56] References Cited

U.S. PATENT DOCUMENTS

| | | | |
|---|---|---|---|
| 2,478,510 | 8/1949 | Stolpe | 74/459 |
| 4,667,521 | 5/1987 | Fuss et al. | 73/862.67 |

FOREIGN PATENT DOCUMENTS 0024677 of 1907 United Kingdom ............. 73/862.49

*Primary Examiner*—Donald O. Wooden
*Attorney, Agent, or Firm*—Townsend and Townsend Khourie and Crew

[57] ABSTRACT

A linear bearing assembly having a load compensating ball bearing array whose rolling friction increases when a sufficiently large load is applied thereto. The design of the ball bearing array permits the assembly to achieve desired torque, efficiency, end play, and static load characteristics with a high tolerance to manufacturing variations in size, surface condition, and other ball bearing characteristics. In one preferred embodiment, the assembly has an initial rolling friction until the force applied to the ball bearings exceeds a transition load, and then has an increased rolling friction after application of the transition load to the ball bearings. This step-wise increase in rolling friction is achieved by packing large, compressible ball bearings with smaller ball bearings in the race of the linear bearing assembly. When a low initial load is applied to the bearings, the large bearings bear the entire load. When the load on the bearings is sufficiently increased, the large bearings compress, thereby transferring a portion of the load to the smaller bearings. The inventive assembly can function as a load sensor if the large bearings have a large (or infinite) electrical resistance and the smaller bearings have a lower resistance. When the large bearings compress in response to a transition load, the small bearings come into electrical contact with a pair of electrically conductive members, thereby closing an electrical circuit or otherwise producing a measurable change in an electrical characteristic of such a circuit.

34 Claims, 2 Drawing Sheets

LINEAR BEARING ASSEMBLY WITH LOAD COMPENSATING BALL BEARING ARRAY

FIELD OF THE INVENTION

The invention relates to linear bearing assemblies, such as lead screw assemblies. More particularly, the invention relates to a linear bearing assembly including a load compensating ball bearing array which has a rolling friction characteristic which undergoes a step increase when a sufficiently large load is applied thereto.

BACKGROUND OF THE INVENTION

In conventional machine tools requiring a high degree of precision, it is conventional to employ precision ground lead screw assemblies. Such a lead screw assembly typically includes a lead screw into which a recessed, spiral-shaped race has been ground, and a nut in which an array of ball bearings has been packed. The ball bearings and the nut are sized so that the ball bearings ride in the race when the nut mates with the screw. As the screw advances relative to the nut, the ball bearings roll along the race. Using such an assembly, the machine tool operator can accurately control the position of the lead screw, typically to within less than $10^{-3}$ inch In other types of conventional linear bearing assemblies, ball bearings (which are sometimes not mounted within a nut) roll in a race (which is sometimes not spiral-shaped) between a first component and a second component, as the first and second components translate linearly with respect to each other.

In constructing a linear bearing assembly, variations in ball bearing size, surface condition, pitch, and other ball bearing characteristics typically cannot be avoided. Such variations can undesirably increase the torque necessary to translate the assembly's first and second components relative to each other, and the friction and tracking error associated with the assembly.

It is often desirable to design a linear bearing assembly (such as a lead screw assembly) to have a very low starting torque (i.e., very low rolling resistance when a load is first applied to the ball bearings) in addition to a high running efficiency, particularly when the assembly is to be used in low heat environments such as a high vacuum.

However, until the present invention, it had not been known how to design a linear bearing assembly to have both extremely low starting torque and high running efficiency, while also avoiding performance degradation resulting from inherent manufacturing variations in the size, surface condition, and other characteristics of the ball bearings employed.

SUMMARY OF THE INVENTION

The invention is a linear bearing assembly including a load compensating ball bearing array which has a rolling friction characteristic which undergoes a step increase in response to application of a sufficiently large load thereto. The design of the inventive ball bearing array permits the linear bearing assembly to achieve desired torque, efficiency, end play, and static load characteristics, with a high tolerance to inherent manufacturing variations in size, surface condition, and other characteristics of the ball bearings employed.

The inventive assembly operates in one of two (or more) modes, each with a different rolling friction characteristic. In a preferred two-mode embodiment, the assembly has a low initial rolling friction and load capacity until the load on the ball bearings is increased to a "transition" load. After the transition load has been applied to the ball bearings, the assembly has an increased rolling friction and an increased load capacity. The step and material characteristics are chosen such that the transition does not put any element under permanent deforming plastic load.

In another class of preferred embodiments, the rolling friction characteristic and load capacity of the inventive assembly undergoes two or more step-wise increases, with step-wise increases in rolling friction and load capacity occurring upon application of successively increased transition loads to the ball bearings.

In order to achieve such a stepped rolling friction characteristic, relatively large compressible ball bearings, and relatively small incompressible ball bearings, are positioned in the race of a linear bearing assembly. When a low initial load is applied to the bearings, the largest bearings bear all such load. Then, when the load on the bearings increases to a transition amount, the largest bearings compress (i.e., temporarily deform), thereby transferring a portion of the load to the bearings having the next largest diameter.

The compressible bearings can be composed of a polyamide such as Vespel (a trademark of E. I. Dupont de Nemours & Company) material, or of Teflon (a trademark of E. I. Dupont de Nemours & Company) material, or of engineering plastic having Teflon or graphite and/or buckyballs as an additive (which will compress under a sufficiently large load without permanently deforming). Throughout this specification, including in the claims, the expression "graphite-loaded" material will be used to denote material having graphite and/or buckyballs as an additive.

In alternative embodiments, the compressible bearings of the invention can be hollow, fluid-filled, or slotted spheres of steel (or another metal), or they can have some other compressible composition or design.

The smallest diameter (incompressible) balls employed in the inventive assembly can be formed of steel, tungsten carbide, ceramic, or another material capable of bearing a very high load without deforming.

In a class of preferred embodiments, the invention functions as a load sensor as well as a linear bearing assembly. In one such embodiment, the invention includes relatively large ball bearings that are electrically insulating, and relatively small balls that are electrically conducting. The bearings fill a race between first and second electrically conductive components (i.e., between a metal screw and a metal nut), and a voltage is applied across the first and the second components. When the larger bearings deform in response to application of a transition load, the smaller (conductive) bearings come into direct contact with the first and the second components, thereby closing an electrical circuit or otherwise producing a measurable change in a characteristic of the circuit. Upon measurement of the resulting change in electrical characteristic, a signal is generated which indicates that a transition load has been applied. In a variation on this embodiment, all the ball bearings are conductive, but the larger bearings have a greater electrical resistance than the smaller bearings. In this variation, too, a signal is produced upon compression of the larger bearings in response to a transition load.

DETAILED DESCRIPTION OF THE PREFERRED EMBODIMENTS

Figure 1:
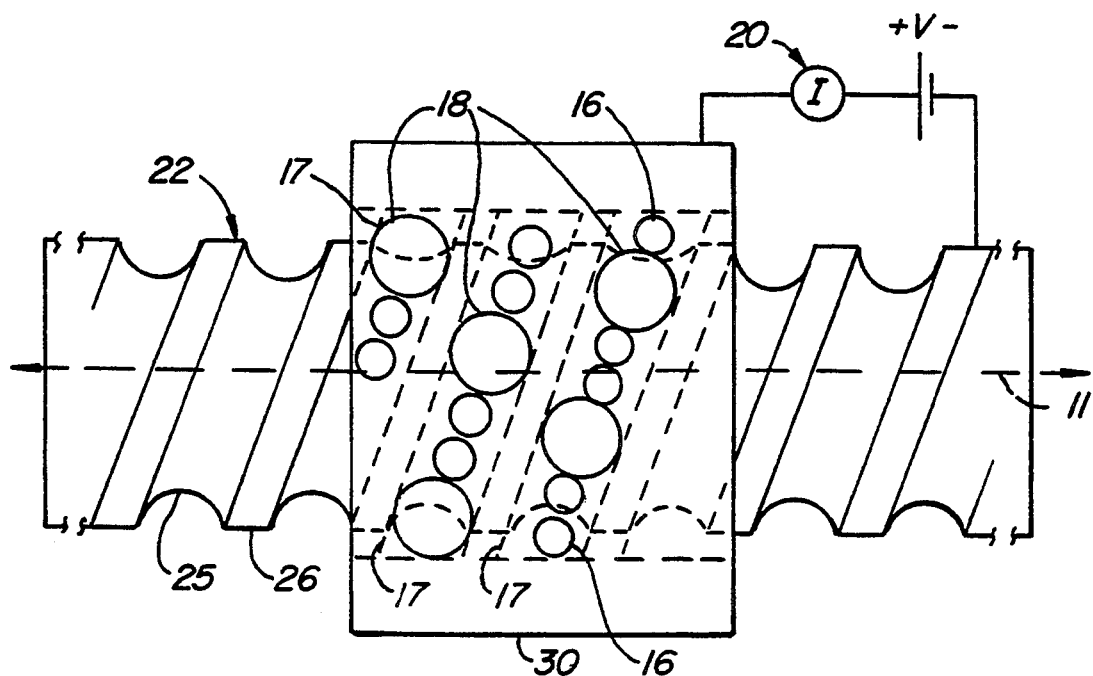
FIG. 1 is a simplified, cross-sectional side view of a screw and nut assembly which embodies the invention.

A first preferred embodiment of the invention will be described with reference to FIG. 1. As shown in FIG. 1, screw 22 has a central threaded portion between its ends. The threaded portion includes a land portion 26 which defines a generally cylindrical surface, and a recessed, helical race 25 around land portion 26.

Nut 30 is sized and shaped to mate with screw 22. With nut 30 positioned around screw 22 as shown, screw 22 will advance (toward the left or right in FIG. 1) with respect to nut 30 as screw 22 rotates with respect to the nut. Large ball bearings 18 and small ball bearings 16 are packed within nut 30 with their spherical surfaces exposed to race 25, so that at least some of bearings 16,18 roll along race 25 as screw 22 advances relative to nut 30. As will be explained in detail below, bearings 18 will compress (in a direction perpendicular to the screw's longitudinal axis 11) under a sufficiently large load, until bearings 16 and 18 share a load exerted by screw 22 on nut 30 (or by nut 30 on screw 22).

Nut 30 is generally cylindrical, has a central longitudinal axis which coincides with central longitudinal axis 11 of screw 22, and has a helical groove 17 along its inner cylindrical surface. Ball bearings 16,18 are packed in groove 17 in the following sequence: one large diameter ball bearing 18 followed by two small diameter ball bearings 16.

When nut 30 is first threaded around screw 22, no force ("load") is exerted on nut 30 in a "normal" direction (a direction perpendicular to the common longitudinal axis 11 of screw 22 and nut 30). When a small normal load is then applied by nut 30 to screw 22 (or by screw 22 to nut 30), large bearings 18 will bear the entire load.

Bearings 18 are compressible in the normal direction, so that when a sufficiently large normal load (denoted herein as a "transition load") is exerted on nut 30, bearings 18 will compress (in the direction of the load) until the load is distributed between compressed bearings 18 and small bearings 16.

To emphasize the important design features of the inventive assembly, the difference in size between large and small bearings 18 and 16 is exaggerated in FIG. 1 in comparison with the typical size difference between such bearings. Also, many more bearings than are shown in FIG. 1 will typically be packed in nut 30 of the inventive assembly, although for simplicity, FIG. 1 shows only a few bearings 16,18 within groove 17.

For example, in one embodiment in which screw 22 is a zero backlash lead screw and race 26 has an outer diameter of 0.75 inches, fifty ball bearings 16 (each having diameter equal to 0.1235 inches) and ten ball bearings 18 (each having diameter equal to 0.1240 inches) are packed in groove 17 of nut 30 (with groove 17 extending twice around the inner cylindrical surface of nut 30). These sixty ball bearings are arranged in ten identical groups of six bearings, each group consisting of one large bearing 18 followed by five consecutive small bearings 16.

In comparison with a conventional design in which sixty-two bearings having 0.1240 inch diameter are packed in groove 17, the inventive design described in the previous paragraph (with steel bearings 16 and 18, and with bearings 18 in a full-sized, undeformed condition) reduces the assembly's starting friction, increases its running efficiency (i.e., from 14% to 70-80%), and reduces its running torque variation.

In another embodiment in which screw 22 is a zero backlash lead screw and race 26 has an outer diameter of 0.75 inches, thirty-one steel ball bearings 16 (each having diameter equal to 0.1215 inches) alternate with thirty-one ball bearings 18 in groove 17 of nut 30. Each ball bearing 18 is composed of graphite-loaded polyamide material, and has a diameter equal to 0.1235 inches. Such graphite-loaded balls can provide lubrication for the ball screw, permitting operations in vacuum or grease sensitive environments.

In comparison with a conventional design in which sixty-two bearings having 0.1240 inch diameter are packed in groove 17, the inventive design described in the previous paragraph (with a load less than fifteen pounds, with balls 18 in their full-sized, undeformed condition bearing the entire load, and with balls 16 bearing none of the load) reduces the assembly's starting torque by more than 400%. Application of a load in excess of a transition load of about 30 pounds will deform graphite-loaded polyamide bearings 18 (by 0.002 inches) until steel bearings 16 are engaged between the screw and nut. With bearings 18 so compressed, the load characteristics of the assembly become essentially those of steel balls 16 (somewhat derated by the fact that only half the normal number of steel balls are engaged). Changing the ratio of graphite-loaded polyamide balls 18 to steel balls 16 linearly changes the transition load. For example, the transition load can be doubled by doubling the ratio of graphite-loaded polyamide balls 18 to steel balls 16 (i.e., by packing single steel ball 16 between sets of three adjacent balls 18).

Figure 2:
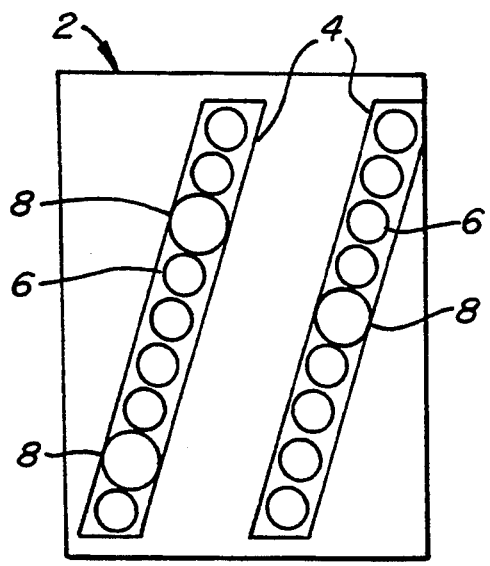
FIG. 2 is a simplified, cross-sectional side view of a nut packed with an array of ball bearings in accordance with a preferred embodiment of the invention.

Numerous variations on the two embodiments described above are possible. For example, FIG. 2 shows an embodiment in which sets of four small ball bearings 6 alternate with single large compressible ball bearings 8 in helical groove 4 of nut 2. Groove 4 is formed around the inner cylindrical surface of generally cylindrical nut 2.

In all embodiments of the invention, ball bearings within a groove (or race) must bear a load between first and second linearly translatable members. The ball bearings rotate as they bear the load and as the first and second members translate linearly with respect to each other. In each embodiment, a minimum number of ball bearings are required to ensure that the ball bearings bear the load between the first and second members at all times; and that the members never directly engage each other. Thus, the requirement for a minimum number of large compressible balls limits the minimum transition load for the assembly.

Relatively inexpensive ball bearings made of steel, polyamide, or Teflon material are commercially available, and suitable for use in constructing many embodiments of the inventive apparatus. However, the mechanical properties of the inventive apparatus can be further controlled by employing other types of ball bearings.

For example, the smallest (non-compressible) balls employed in any embodiment of the invention may be composed of tungsten carbide or ceramic material, for increased stiffness during operation after application of a transition load (or the highest transition load in multiple mode systems of the type to be described with reference to FIG. 5).

The compressible balls employed in any embodiment of the invention may be composed of bearing bronze, to achieve starting friction as low as can be achieved using Teflon or polyamide balls, but with a higher transition load than can be achieved using Teflon or polyamide balls.

Alternatively, the compressible balls can be hollow (or fluid-filled) metal balls. Such balls are particularly useful in high pitch or large ball bearing diameter lead screw systems, in which there are so few balls engaged at any time between the nut and the screw that solid balls may not provide enough compliance to effectively lower the systems' starting torques and pitch variations. Hollow (or fluid-filled) balls can be tailored to have virtually any compliance or flexure appropriate to an application. Hollow steel balls have surface hardness approaching that of solid steel balls and thus retain most of the wear characteristics of solid steel balls.

Balls made of composite materials such as carbon or boron fibers in a matrix such as carbon or epoxy can also combine high surface hardness with controlled compliance.

Filled balls (such as polycarbonate filled with Teflon, polyamide, and/or graphite material, and/or buckyballs) can provide low surface friction with controlled compliance. Such balls can provide low starting torque with a higher transition load than can be achieved using balls composed entirely of polyamide or Teflon material.

Figure 3:
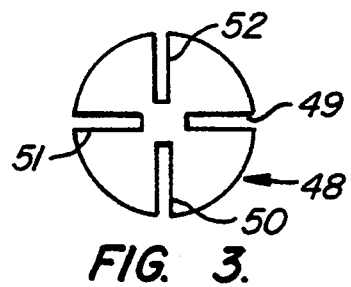
FIG. 3 is a top elevational view of a slotted ball bearing of the type employed in a second preferred embodiment of the invention.
Figure 4:
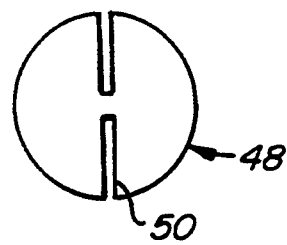
FIG. 4 is a side elevational view of a slotted ball bearing of FIG. 3.

The above-described advantages of hollow balls can also be achieved using slotted balls, such as ball 48 shown in FIGS. 3 and 4. Four symmetrically placed slots 49, 50, 51, and 52, have been cut into the outer spherical surface of ball 48. As shown in FIG. 3, the slots need not extend all the way to the center of ball 48, but they should extend sufficiently far that the ball can be compressed by crushing together the side walls of one of more of the slots. In various alternative embodiments, the slots extend through the ball center (but, of course, not all the way through the ball), the slots are not symmetrically oriented with respect to the ball center, or the slots are curved (rather than straight) to eliminate tracking within the ball grooves. Ball 48 can be composed of any of a variety of materials, including steel or case hardened steel.

There are many possible variations on the slotted ball design shown in FIGS. 3 and 4. Depending on the number and shape of the slots, the width and depth of each slot, the type of ball material, and the hardening processes applied to the ball material, any of a wide variety of compliance characteristics can be achieved. In general, slotted balls (such as ball 48) are less expensive and easier to manufacture than hollow balls of the same diameter, particularly where the required ball diameter is large (0.200 inches or more).

Next, a class of embodiments in which ball bearings of three or more different sizes are packed (along a groove or race) between a pair of linearly translating members will be discussed with reference to FIG. 5. In each such embodiment, the smallest diameter ball bearings (such as balls 70 packed within helical groove 64 in the inner cylindrical surface of nut 62 of FIG. 5) should be substantially non-compressive over the range of loads to be encountered during operation. The set of balls having the largest diameter should be compressible in response to a first (relatively small) transition load, and the set of balls having the second largest diameter should be compressible in response to a second transition load (larger than the first transition load, and so on. Thus, as successively increasing loads are applied to the assembly, successively smaller balls will compress, thereby transferring the load to the balls having the next largest diameter.

Figure 5:
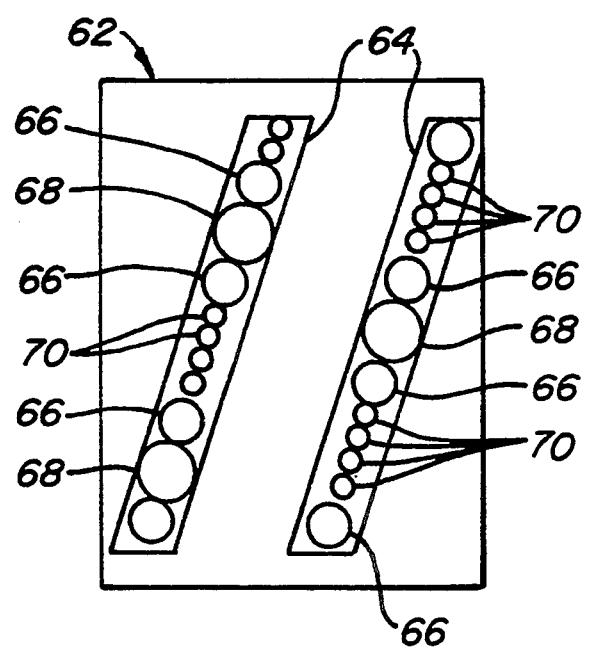
FIG. 5 is a simplified, cross-sectional side view of a nut packed with an array of ball bearings in accordance with a third preferred embodiment of the invention.

For example in FIG. 5, helical groove 64 of nut 62 is packed with a repeating sequence of the following ball bearings: four small (incompressible) diameter bearings 70, an intermediate diameter (compressible) bearing 66, a large diameter (compressible) bearing 68, and another intermediate diameter (compressible) bearing 66.

When nut 62 is initially threaded around a screw, the normal load exerted between nut 62 and the screw is borne by uncompressed large bearings 68. Then, when the normal load applied by nut 62 to the screw (or by the screw to nut 62) is increased to a first transition load, bearings 68 will deform until the transition load is shared by compressed bearings 68 and uncompressed bearings 66. Then, if the normal load is further increased to a second transition load, bearings 66 will deform (and bearings 68 will further deform) until the transition load is shared by compressed bearings 66 and 68 and uncompressed bearings 70.

Accordingly, the FIG. 5 embodiment has three different rolling friction characteristics: a first one in the initial normal load range from zero to the first transition load, the second one in the normal load range from the first transition load up to the second transition load, and the third one in the normal load range greater than or equal to the second transition load, In variations on the FIG. 5 embodiment including ball bearings of three different sizes, and in alternative embodiments including ball bearings of more than three different sizes, the inventive assembly has three or more different rolling friction characteristics, each of which supersedes a preceding one upon application of a successively increased transition load to the ball bearings.

With reference again to FIG. 1, the invention preferably includes means enabling it to function as a load sensor as well as a linear bearing assembly. In FIG. 1, such load sensor means includes a voltage source which applies a voltage V between the linearly translatable components supported by the ball bearing array (i.e., nut 30 and screw 22). The larger ball bearings (bearings 18) in race 25 between nut 30 and screw 22 have a higher electrical resistance than do the smaller bearings (bearings 16) in the race. Thus, when larger bearings 18 complete the electric circuit between the voltage source, screw 22, and nut 30, current meter 20 (connected in series with the voltage source) will measure a first current. Then, when bearings 18 compress in response to a transition load, a second current (greater than the first current) will flow through the electric circuit comprising small bearings 16, nut 30, meter 20, the voltage source, and screw 22.

In a variation on this embodiment, the invention larger bearings 18 are composed of electrically insulating material (such as graphite-loaded polyamide or Teflon material), and smaller bearings 16 are electrically conductive. In this case, when bearings 18 compress in response to application of a transition load, smaller bearings 16 come into direct contact with nut 30 and screw 22, thereby closing the formerly open electrical circuit comprising the bearings in race 25, nut 30, meter 20, the voltage source, and screw 22. At the same time, meter 20 will generate a signal indicating that current has commenced to flow, which in turn indicates that a transition load has been applied to the bearings. This signal can be used to trigger generation of a control signal (for example, to compensate for positional inaccuracies caused by the large load on the bearings).

Current meter 20 can of course be replaced by a voltage meter, or any other measuring means capable of indicating a change in the electrical characteristics of the circuit comprising the bearings in race 25, nut 30, meter 20, the voltage source, and screw 22, in response to application of a transition load to the bearings.

More generally, it is within the scope of the invention to provide large compressible bearings, having a relatively large (possible infinite) resistance, and smaller bearings having a lower resistance in a race between first and second electrically conductive linearly translatable components, and to apply a voltage across the first and the second components while monitoring an electrical characteristic of the circuit so defined, to detect a change in the characteristic indicative of the application of a transition load to the bearings.

Alternatively, one or more of the bearings can be composed of piezoelectric or strain resistive material, so that each said bearing functions as an active or passive load variable element. In this case, the invention includes a circuit means for monitoring an electrical characteristic of each such bearing, to continuously monitor the load being applied to the bearing. Such a combination of an active or passive load variable element and monitoring circuit means can be included in addition to, or as a substitute for, a transition load detecting electric circuit of the type described in the previous paragraph. In some embodiments, the load variable element is driven to provide mechanical load variation.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A linear bearing assembly, including:
    a first member having a surface which defines a recessed race;
    a second member, having a surface shaped for confining ball bearings in the race, and engaged with the first member for linear movement relative to the first member; and
    a load compensating ball bearing array positioned in the race, and including first and second pluralities of balls which bear a load between the first member and the second member and roll in the race as the second member moves linearly relative to the first member;
    the first plurality of balls being characterized by a first diameter and a first degree of compressibility;
    the second plurality of balls being characterized by second diameter smaller than said first diameter, and a second degree of compressibility;
    the relative diameters and degrees of compressibility being chosen so that under loads less than a transition load at least some of the first plurality of balls and none of the second plurality of balls bear the load and under loads greater than the transition load at least some of the first plurality of balls and at least some of the second plurality of balls bear the load.

2. The assembly of claim 1, wherein the first member is a screw and the second member is a nut dimensioned for mating engagement with the screw.

3. The assembly of claim 1, wherein the load compensating ball bearing array has a rolling friction characteristic which undergoes a step increase in response to application of the transition load thereto.

4. The assembly of claim 3, wherein step and material characteristics of the load compensating ball bearing array are chosen such that no component of the load compensating ball bearing array is placed under a permanent deforming plastic load upon application of the transition load to the load compensating ball bearing array.

5. The assembly of claim 3, wherein each ball in the first plurality of balls is more compressible than each ball in the second plurality of balls.

6. The assembly of claim 5, also including:
    a third plurality of balls, having a diameter substantially equal to a third diameter smaller than the first diameter but larger than the second diameter.

7. The assembly of claim 5, wherein each of the first plurality of balls is a hollow metal ball.

8. The assembly of claim 5, wherein each of the first plurality of balls is a slotted metal ball.

9. The assembly of claim 5, wherein each of the first plurality of balls is a fluid-filled metal ball.

10. The assembly of claim 5 wherein the first plurality of balls includes ten balls, wherein the first diameter is substantially equal to 0.1240 inches, wherein the second plurality of balls includes fifty balls, and wherein the second diameter is substantially equal to 0.1235 inches.

11. The assembly of claim 5, wherein the first plurality of balls includes a first number of balls, the second plurality of balls includes the first number of balls, and the balls in the first plurality alternate with the balls in the second plurality in the race.

12. The assembly of claim 11, wherein the first plurality of balls includes thirty-one balls, the first diameter is substantially equal to 0.1235 inches, and the second diameter is substantially equal to 0.1215 inches.

13. The assembly of claim 5, wherein each of the first plurality of balls is formed of polyamide material.

14. The assembly of claim 5, wherein each of the first plurality of balls is formed of graphite-loaded polyamide material.

15. The assembly of claim 1, also including means for generating a signal in response to application of the transition load to the load compensating ball bearing array.

16. The assembly of claim 1, wherein the first member and the second member are electrically conductive, and also including:

a voltage source for applying a potential difference across the first member and the second member; and a measurement means connected in series with the voltage source for monitoring an electrical characteristic of an electrical circuit including the first member, the second member, and the voltage source 17. The assembly of claim 16, wherein the first plurality of balls are electrically insulating and the second plurality of balls are electrically conductive.

18. The assembly of claim 16, wherein the first plurality of balls have a first electrical resistance and the second plurality of balls have a second electrical resistance that is lower than the first electrical resistance.

19. A linear bearing assembly, including:
a screw having a land portion defining a generally cylindrical surface, and a recessed helical race around the land portion;
a nut dimensioned for mating engagement with the screw, and having a surface defining a helical groove shaped for confining ball bearings in the race; and
a load compensating ball bearing array positioned between the race and the groove, and including first and second pluralities of balls which bear a load between the screw and the nut, and which roll in the race as the screw advances relative to the nut;
the first plurality of balls being characterized by a first diameter and a first degree of compressibility;
the second plurality of balls being characterized by a second diameter smaller than said first diameter, and a second degree of compressibility;
the relative diameters and degrees of compressibility being chosen so that under loads less than a transition load at least some of the first plurality of balls and none of the second plurality of balls bear the load and under loads greater than the transition load at least some of the first plurality of balls and at least some of the second plurality of balls bear the load.

20. The assembly of claim 19, also including means for generating a signal in response to application of the transition load to the load compensating ball bearing array.

21. The assembly of claim 19, wherein step and material characteristics of the load compensating ball bearing array are chosen such that no component of the load compensating ball bearing array is placed under a permanent deforming plastic load upon application of the transition load to the load compensating ball bearing array.

22. The assembly of claim 19, wherein the screw and the nut are electrically conductive, and also including:
a voltage source connected between the screw and the nut for applying a potential difference between the screw and the nut, and wherein the first plurality of balls are electrically insulating and the second plurality of balls are electrically conductive, and wherein upon application of the transition load to the balls in the first plurality, said balls in the first plurality compress until the balls in the second plurality come into direct electrical contact with both the screw and the nut, thereby closing an electrical circuit including the screw, the voltage source, and the nut.

23. The assembly of claim 19, wherein the screw and the nut are electrically conductive, and also including: a voltage source connected between the screw and the nut for applying a potential difference between the screw and the nut, and wherein the first plurality of balls have a first electrical resistance; and the second plurality of balls have a second electrical resistance lower than the first electrical resistance, and wherein upon application of the transition load to the balls in the first plurality, the balls in the first plurality compress until the balls in the second plurality come into direct electrical contact with both the screw and the nut, thereby producing a measurable change in a characteristic of an electrical circuit including the screw, the voltage source, and the nut.

24. The assembly of claim 19, wherein the load compensating ball bearing array has a rolling friction characteristic which undergoes a step increase in response to application of the transition load thereto.

25. The assembly of claim 24, wherein each ball in the first plurality of balls is more compressible than each ball in the second plurality of a balls.

26. The assembly of claim 25, also including:
a third plurality of balls, having a diameter substantially equal to a third diameter smaller than the first diameter but larger than the second diameter.

27. The assembly of claim 25, wherein each of the first plurality of balls is a hollow metal ball.

28. The assembly of claim 25, wherein each of the first plurality of balls is a slotted metal ball.

29. The assembly of claim 25, wherein each of the first plurality of balls is a fluid-filled metal ball.

30. The assembly of claim 25, wherein each of the first plurality of balls is formed of polyamide material.

31. The assembly of claim 25, wherein each of the first plurality balls is formed of graphite-loaded polyamide material.

32. The assembly of claim 25, wherein the first plurality of balls includes ten balls, wherein the first diameter is substantially equal to 0.1240 inches, wherein the second plurality of balls includes fifty balls, and wherein the second diameter is substantially equal to 0.1235 inches.

33. The assembly of claim 25, wherein the first plurality of balls includes a first number of balls, the second plurality of balls includes the first number of balls, and the balls in the first plurality alternate with the balls in the second plurality in the race.

34. The assembly of claim 33, wherein the first plurality of balls includes thirty-one balls, the first diameter is substantially equal to 0.1235 inches, and the second diameter is substantially equal to 0.1215 inches.

* * * * *